US012766349B1

(12) United States Patent
Hla et al.

(10) Patent No.: US 12,766,349 B1
(45) Date of Patent: Oct. 20, 2026

(54) METHOD AND SYSTEM FOR EXTINGUISHING A FIRE

(71) Applicants: Peter Aung Hla, Washington, DC (US); Myint Myint San, Washington, DC (US)

(72) Inventors: Peter Aung Hla, Washington, DC (US); Myint Myint San, Washington, DC (US)

( * ) Notice: Subject to any disclaimer, the term of this patent is extended or adjusted under 35 U.S.C. 154(b) by 0 days.

(21) Appl. No.: 19/304,704

(22) Filed: Aug. 20, 2025

(51) Int. Cl.
*A62C 3/02* (2006.01)

(52) U.S. Cl.
CPC .......... *A62C 3/0242* (2013.01); *A62C 3/0271* (2013.01)

(58) Field of Classification Search
CPC ....... A62C 3/02; A62C 3/0242; A62C 3/0228; A62C 3/0271
See application file for complete search history.

(56) References Cited

U.S. PATENT DOCUMENTS 102,431 A 4/1870 Pinkham
3,367,280 A 2/1968 Bennett et al.
3,682,250 A 8/1972 Horwinski
5,540,284 A 7/1996 Esposito et al.
6,035,940 A 3/2000 Bourke
9,663,234 B1 5/2017 Hanlon
9,833,647 B2 * 12/2017 Kawiecki ............... A62C 37/00
10,836,508 B2 11/2020 Overall et al.
11,433,266 B2 9/2022 Farzam et al.
11,938,356 B1 3/2024 Wengreen
2009/0205845 A1 * 8/2009 Hoffman ................ A62C 3/025 701/2
2010/0078184 A1 4/2010 Pellittiere, II et al.
2011/0266011 A1 11/2011 Lee
2012/0160268 A1 6/2012 Massey
2014/0076996 A1 3/2014 Hayton et al.
2015/0096768 A1 4/2015 DuBrucq et al.
2017/0043872 A1 2/2017 Whitaker et al.
2017/0231213 A1 8/2017 Gordon et al.
2019/0314657 A1 10/2019 Hofmann
2021/0113870 A1 4/2021 Ziegenfuss
2021/0138281 A1 5/2021 Nohmi (Continued)

FOREIGN PATENT DOCUMENTS

AU 2022283754 2/2023
CN 114534134 A * 5/2022 ............... B64D 1/04

(Continued)

*Primary Examiner* — Jason J Boeckmann
(74) *Attorney, Agent, or Firm* — The Law Office of Kevin McDermott, P.L.L.C.

(57) ABSTRACT

A method of extinguishing a wildfire is provided that includes receiving data about a fire from a satellite. The data includes at least a location, size, and temperature of the fire. Moreover, the method includes determining, based on the data, an amount of fire retardant required to extinguish the fire. The fire retardant is liquid nitrogen. Furthermore, the method includes determining a type of aerial vehicle, loading the aerial vehicle with the determined amount of fire retardant, deploying the aerial vehicle to the location of the fire, and spraying the fire retardant on the fire. Liquid nitrogen can be sprayed on all sides of large fires resulting from explosions of trains or factories to extinguish the fires. Additionally, liquid nitrogen can be sprayed on wildfires and into burning buildings and houses to extinguish fires.

10 Claims, 6 Drawing Sheets

(56) References Cited

U.S. PATENT DOCUMENTS

| | | | | |
|---|---|---|---|---|
| 2022/0080237 | A1* | 3/2022 | Predonu ............... | B64U 30/293 |
| 2023/0201645 | A1 | 6/2023 | Cain, Sr. et al. | |
| 2023/0364457 | A1 | 11/2023 | Oilar | |

FOREIGN PATENT DOCUMENTS

| | | | | | |
|---|---|---|---|---|---|
| CN | 115535243 | A | * | 12/2022 | ........... A62C 3/0242 |
| JP | 3217561 | | | 8/2018 | |
| KR | 20230019772 | A | | 9/2023 | |
| WO | WO 2014/022533 | | | 2/2014 | |
| WO | WO 2014/080385 | | | 5/2014 | |
| WO | WO 2019/208440 | | | 10/2019 | |

* cited by examiner

METHOD AND SYSTEM FOR EXTINGUISHING A FIRE

BACKGROUND OF THE INVENTION

This invention relates generally to extinguishing fires, and more particularly, to a method and system for extinguishing a fire.

Wildfires and building fires have been known to destroy forests, plants, and houses, to kill people and animals, and to release carbon dioxide gas, toxic fumes, soot and ash into the atmosphere. Ash and soot from the wildfires can be blown high into the atmosphere and have been known to eventually settle on the snow and ice at the Earth's poles in the Arctic and *Antarctica*. After settling in the snow and ice, the ash and soot are warmed by the sun. As a result, the ash and soot may accelerate melting of the snow and ice at the poles, which eventually causes sea levels to rise. Carbon dioxide gas produced by wildfires may cause a greenhouse effect which can cause heat to be absorbed and radiated towards the Earth and perhaps contribute to climate change.

It is known that thousands of wild fires may be burning around the Earth at any one time. For example, during the summer of 2025 it has been reported that there are at least two hundred twenty-five active wild fires in Canada with around one hundred and twenty deemed out of control. It is estimated that more than three and a half million hectares of forests may be destroyed. Burning such a large area releases enormous amounts of ash, soot, carbon dioxide gas, and toxic fumes into the atmosphere.

Moreover, in January 2025 California wild fires could not be controlled by fire fighters. As a result, the fires destroyed thousands of homes and many people lost their lives. Many homes experienced smoke damage only, but had to be demolished. Furthermore, CBS News reported on 2025 Jul. 12 that "Wildfire near Grand Canyon expands almost twenty-fold over 24 hours. What officials have dubbed the White Sage Fire in Jacob Lake, Arizona-roughly 650 miles southwest of Denver, Colorado—has grown from 1,000 acres to nearly 20,000 acres, according to a government website that tracks U.S. wildfires. It is 0% contained." In view of the above, it can be seen that many times authorities learn about wildfires after the fires become too big to control.

It has been reported that between 2014 and 2023 there were 344,600 fires in the United States that resulted in two thousand eight hundred ninety deaths, ten thousand four hundred injuries, and eleven million two hundred sixty-six thousand two hundred dollars in damage.

Known methods for fighting wild fires typically include dumping water on the wild fire from above, building fire control lines, spraying chemical fire retardants and spraying water from hoses by fire fighters. Known methods for fighting building fires also typically include spraying water onto the building fires. However, in view of the above, it can be seen that these conventional firefighting techniques are not very effective Thus, it would be advantageous and an improvement over the relevant technology to provide a method and system for fighting wildfires and building fires that enables quickly and thoroughly extinguishing fires.

BRIEF DESCRIPTION OF THE INVENTION

In one aspect of the present disclosure a method of extinguishing a fire is provided that includes receiving, by an electronic device, data about a fire from a satellite. The data includes at least a location, size, and temperature of the fire. Moreover, the method includes determining, based on the data, an amount of fire retardant required to extinguish the fire. The fire retardant is liquid nitrogen. Furthermore, the method includes determining, based on the determined amount of fire retardant, a type of aerial vehicle, and loading the determined type of aerial vehicle with the determined amount of fire retardant. The amount of fire retardant loaded on the determined type of aerial vehicle is a payload. Additionally, the method includes deploying the loaded determined type of aerial vehicle to the location of the fire and spraying, by the loaded determined type of aerial vehicle, the fire retardant on the fire.

In one embodiment of the disclosure the determined type of aerial vehicle is an autonomously controlled drone, and the spraying step includes collecting, by the autonomously controlled drone, data about the fire. The collected data includes at least the areas of the fire with the highest temperatures, the wind direction about the fire, and the wind speed about the fire. Moreover, the method includes determining, by the autonomously controlled drone based on the collected data, an optimal location of the fire to spray with the fire retardant and spraying, by the autonomously controlled drone, the fire retardant on the fire at the optimal location.

In another embodiment of the present disclosure the determined type of aerial vehicle is a remotely controlled drone and the spraying step includes collecting, by the drone, data about the fire. The collected data includes at least the areas of the fire with the highest temperatures, the wind direction about the fire, and the wind speed about the fire. Moreover, the method includes transmitting, via a network, the collected data to the electronic device, displaying the collected data for a user to see, and determining, by the user, an optimal location of the fire to spray with the fire retardant. Furthermore, the method includes, transmitting, via the network, the optimal location to the drone and spraying, by the drone, the fire retardant on the fire at the optimal location.

In yet another embodiment of the present disclosure, the determined type of aerial vehicle includes a plurality of autonomously controlled drones and the spraying step includes collecting, by each autonomously controlled drone, data about the fire. The collected data includes at least the areas of the fire with the highest temperatures, the wind direction about the fire, and the wind speed about the fire. Moreover, the method includes determining, based on the collected data, optimal locations of the fire to spray with the fire retardant. Each of the plurality of drones is assigned a different one of the optimal locations. Further, the method includes spraying, by each of the autonomously controlled drones, the fire retardant on the fire at the optimal location assigned to the respective drone.

In yet another embodiment of the present disclosure, the data collected by each autonomous drone is communicated with the other autonomous drones or the electronic device, and one of the plurality of drones or the electronic device determines, based on the collected data, optimal locations of the fire to spray with the fire retardant.

In yet another embodiment of the present disclosure, the loading step includes loading each autonomously controlled drone with a portion of the determined amount of fire retardant. The portions are determined based on flight time to the location of the fire and can be the same or different.

In yet another embodiment of the present disclosure, the determined type of aerial vehicle includes at least one cryogenic tank for storing the determined amount of fire retardant and the at least one cryogenic tank includes a shut-off valve. The shut-off valve is remotely controlled by the electronic device or autonomously controlled by the determined type of aerial vehicle.

In yet another embodiment of the present disclosure, the loading step includes loading each autonomously controlled drone with a different portion of the determined amount of fire retardant. The different portion being the amount of fire retardant to be sprayed at the location assigned to the respective drone.

In yet another embodiment of the present disclosure, the method further includes collecting, by each autonomously controlled drone, data about the fire. The collected data includes at least the areas of the fire with the highest temperatures, the wind direction about the fire, and the wind speed about the fire. Moreover, the method includes determining, based on the collected data, optimal locations of the fire to spray with the fire retardant. Each of the plurality of drones is assigned a same or different one of the optimal locations.

Additionally, the method includes loading each autonomously controlled drone with a different portion of the determined amount of fire retardant. The different portion being the amount of fire retardant to be sprayed at the location assigned to the respective drone. The method also includes spraying, by each of the autonomously controlled drones, the fire retardant on the fire at the optimal location assigned to the respective drone. Drones assigned to the same optimal location spray the fire retardant on the fire at different times.

In yet another embodiment of the present disclosure, the method further includes changing the optimal location assigned to one of the plurality of autonomously controlled drones while the drone is at or en route to the fire.

In another aspect of the present disclosure a method of extinguishing a fire is provided that includes manually carrying, by a fire fighter, a liquid nitrogen tank. The tank includes a vent and a pump for pumping the liquid nitrogen out of the cylinder. Moreover, the method includes closing the vent, activating the pump, and spraying, by the fire fighter, liquid nitrogen pumped out of the tank on the fire.

In one embodiment of the present disclosure, the liquid nitrogen tank includes a metal spray pipe and the method further includes, using, by the fire fighter, the metal spray pipe to spray the liquid nitrogen in hard-to-reach locations within a building.

In yet another aspect of the present disclosure a method of extinguishing a fire is provided that includes loading cryogenic tanks on a truck. The tanks contain liquid nitrogen. Moreover, the method includes spraying, by a fire fighter, the liquid nitrogen over, near, or around a wildfire, or a building structure fire to extinguish the fire.

DETAILED DESCRIPTION OF THE INVENTION

Figure 1:
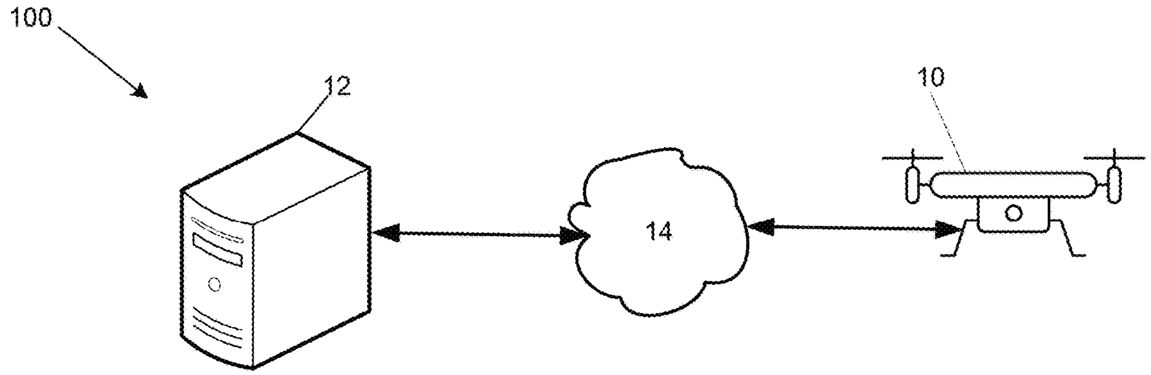
FIG. 1 is a schematic diagram of an example computer system for use in extinguishing fires according to an embodiment of the present disclosure.

FIG. 1 is a schematic diagram of an example computer system 100 for use in extinguishing fires according to an embodiment of the present disclosure. As shown in FIG. 1, the main elements of the system 100 include an aerial vehicle (AV) 10 and an electronic device 12 communicatively connected via a network 14. The AV 10 may be any type of AV capable of performing the functions described herein. The AV 10 may be, for example, an airplane, a helicopter, an unmanned remote-controlled aerial vehicle or an unmanned autonomously controlled aerial vehicle. Unmanned aerial vehicles are typically known as drones.

The electronic device 12 can be, for example, any type of server or computer implemented as a network server or network computer. The electronic device 12 can be any electronic device capable of at least communicating with the AV 10 via the network 14, facilitating creation of flight plan instructions, transmitting flight plan instructions to the AV 10, downloading applications over the Internet, running applications, capturing and storing data temporarily and/or permanently, and otherwise performing any and all functions described herein by any computer, computer system, server or electronic device included in the system 100. The electronic device 12 may alternatively be a hand-held portable device or a stationary electronic device. One example of the electronic device 12 is a smart phone. Other examples include, but are not limited to, a cellular phone, a tablet computer, a phablet computer, a laptop computer, a personal computer (PC), and any type of hand-held consumer electronic device having wired or wireless networking capabilities capable of performing the functions, methods, and/or algorithms described herein.

The electronic device 12 may be used to manage the AV 10, for example, by communicating indirectly through the network 14 or directly to locate the AV 10, to identify the AV 10, ascertain capabilities of the AV 10, monitor the operating status of the AV 10, receive, store and process sensor data generated by the AV 10, and provide flight path instructions to the AV 10.

The electronic device 12 is typically associated with a single person who operates the device 12. The person who is associated with and operates the electronic device 12 can referred to herein as a user or an operator. It is contemplated by the present disclosure that the user or operator may remotely control the AV 10 via the electronic device 12.

The network 14 may be implemented as a 5G communications network.

Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be implemented as a radio access network (RAN) that includes a core network and one or more base stations (not shown). As such, the RAN may include a long-term evolution (LTE) network or other third generation (3G), fourth generation (4G) wireless network, or fifth-generation (5G) wireless network. Additionally, or alternatively, the network 14 may be implemented by one or more other communication networks, such as, but not limited to, a satellite communication network, or a microwave radio network.

It is contemplated by the present disclosure that the number of AVs 10 and electronic devices 12 is not limited to the number shown in the system 100. Rather, any number of AVs 10 and electronic devices 14 may be included in the system 100.

Figure 2:
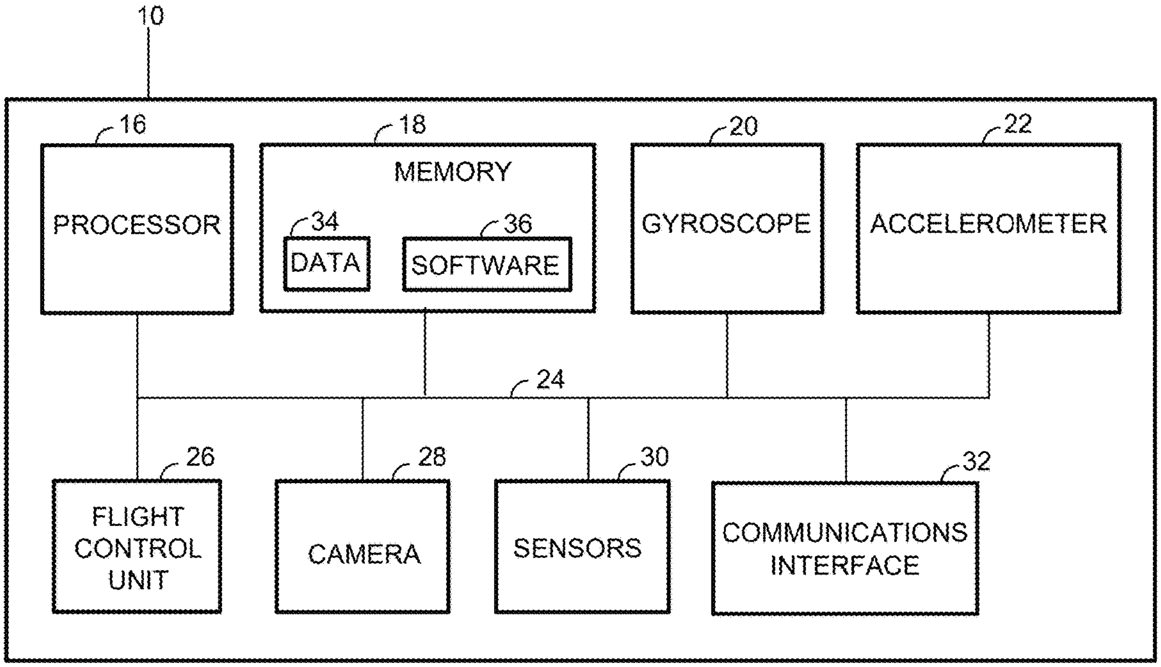
FIG. 2 is a more detailed schematic block diagram of an example aerial vehicle included in the computer system as shown in FIG. 1.

FIG. 2 is a more detailed schematic block diagram of the example AV 10. More specifically, the AV 10 includes components such as, but not limited to, one or more processors 16, a memory 18, a gyroscope 20, an accelerometer 22, a bus 24, a flight control unit 26, a camera 28, sensors 30 and a communications interface 32. General communication between the components in the AV 10 is provided via the bus 24.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory) or the like.

The memory 18 may be used to store any type of data 34 including, but not limited to, image data, flight plan instructions, locations of fires, the velocity of wind about a fire, the direction of the wind about a fire, and the temperature around a fire.

Additionally, the memory 18 can be used to store software 36. As used herein, the term "software" is intended to encompass an executable computer program that exists permanently or temporarily on any non-transitory computer-readable recordable medium that causes the AV 10 to perform at least a portion of the functions, methods, and/or algorithms described herein. Software includes, but is not limited to, operating systems, Internet browser applications, instructions for calculating an amount of fire retardant required to extinguish a fire, instructions for determining the type of aerial vehicle for fighting a fire, instructions for determining flight plans, instructions for determining the optimal location of a fire to spray, instructions for determining when to spray the liquid nitrogen, instructions for calculating bail angles, instructions for calculating crowd angles, instructions for calculating moments of inertia, return to home applications, and any other software and/or any type of instructions associated with algorithms, processes, or operations for controlling the general functions and operations of the AV 10. The software may also include computer programs that implement buffers and use RAM to store temporary data.

The instructions for determining when to spray the liquid nitrogen may indicate that the liquid nitrogen is to be sprayed when the temperature beneath the AV 10 is, for example, seven hundred degrees Fahrenheit. Alternatively, the temperature at which the liquid nitrogen is sprayed may be any temperature deemed to facilitate best fighting the fire.

The instructions for determining flight plans may include, for example, instructions for navigating to a fire using light detection and ranging (LIDAR) technology, global positioning system (GPS) technology, or inertial navigation system (INS) technology. LIDAR is a technology used to create high-resolution models of ground elevation with a vertical accuracy of about four inches. Return-to-Home (RTH) applications cause the AV 10 to return to a location, for example, a home location. RTH applications may operate automatically or may operate in response to input from a user.

The gyroscope 20 and the one or more accelerometers 22 generate data regarding rotation and translation of the AV 10 that may be communicated to the processor 16 and the memory 18 via the bus 24. The gyroscope measures and maintains orientation and angular velocity of the AV 10 and thus facilitates accurately and reliably navigating and controlling movement of the AV 10. The accelerometer 22 can be used to facilitate stabilizing the AV 10 by measuring the orientation of the AV 10 as well as the effects of sudden acceleration due to wind or sharp turns.

The flight control unit 26 may include any appropriate avionics, control actuators, or other equipment required to fly the AV 10 via remote control or autonomously.

The camera 28 captures image data. Image data can be a digital image or a sequence of digital images. A sequence of images includes videos. As used herein, capture means to record data temporarily or permanently, for example, image data of fire and the topography surrounding a fire. The camera 28 can be one or more imaging devices configured to record image data of any type of fire, for example, wildfires and building fires. The camera 28 can be integrated into the AV 10 and can incorporate a sensor, for example and without limitation, a CCD or CMOS sensor. The camera 28 may alternatively be, or additionally include, an infrared camera capable of measuring thermal radiation emitted by a fire. Such cameras 28 are generally known as thermal imaging cameras. The AV 10 may navigate around a fire to determine the temperatures in different areas of the fire and map the temperatures across the fire.

Sensors 30 include, but are not limited to, at least one temperature sensor, at least one pressure sensor, at least one humidity sensor, at least one gas sensor, at least one altitude sensor, at least one velocity sensor, at least one location sensor, at least one sensor for detecting the direction of wind, and at least one sensor for measuring the velocity of wind about a fire. The sensor for measuring the direction and velocity of the wind may be, for example, an anemometer. Using the data collected by the anemometer, enables the AV 10 to decide which side of the fire is the windward side and the safety of flight relative to the wind speed.

The communications interface 32 may include one or more transceivers to enable the AV 10 to communicate with, for example, the electronic device 12 and a service platform (not shown) via the network 14, or any other computing devices (not shown). The electronic device 12 may communicate with the AV 10 directly or indirectly.

The communications interface 32 may alternatively, or additionally, include, for example, one or more long-range transceivers to permit the AV 10 to communicate with the network 14.

The communications interface 32 may additionally, or alternatively, include, for example, one or more short-range transceivers to permit communications with sensors 30, docking stations, other AVs or other electronic devices (not shown). Such short-range transceivers can be implemented by a type of transceiver supporting short-range wireless networking such as, but not limited to, Wi-Fi transceivers, Bluetooth® transceivers, infrared (IR) transceivers, and other transceivers that are configured to allow the AV 10 to intercommunicate via an ad-hoc or other wireless network.

Figure 3:
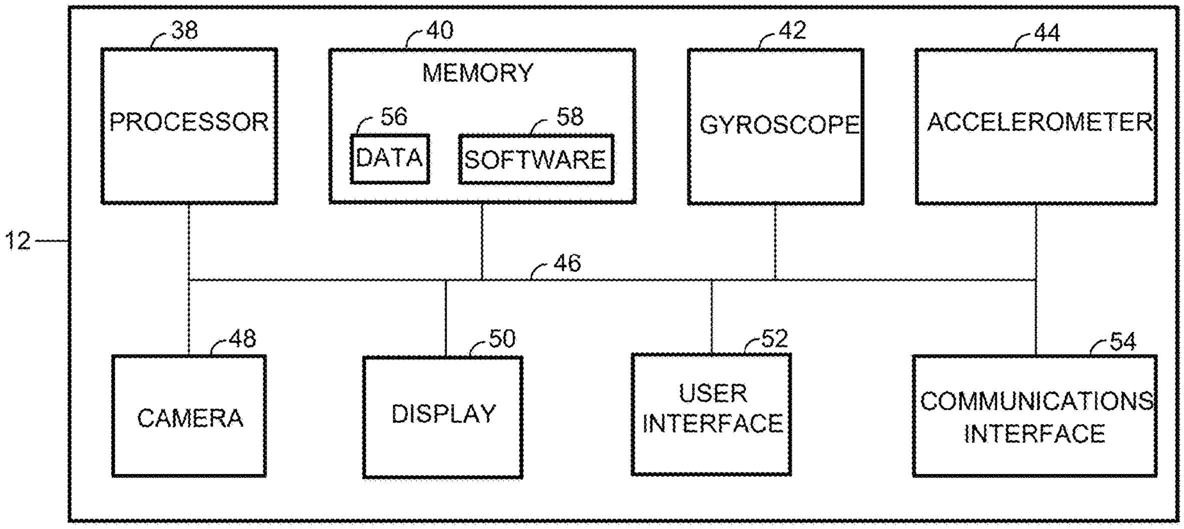
FIG. 3 is a more detailed schematic block diagram of an example electronic device included in the computer system as shown in FIG. 1.

FIG. 3 is a more detailed schematic diagram illustrating the electronic device 12. More specifically, the electronic device 12 includes components such as, but not limited to, one or more processors 38, a memory 40, a gyroscope 42, an accelerometer 44, a bus 46, a camera 48, a display 50, a user interface 52, and a communications interface 54. General communication between the components in the electronic device 14 is provided via the bus 46.

The processor 38, memory 40, gyroscope 42, accelerometer 44, bus 46, camera 48, and communications interface 54 are similar to the processor 16, memory 18, gyroscope 20, accelerometer 22, bus 24, camera 28, and communications interface 32, respectively, as described herein with regard to FIG. 2.

The display 50 may include a visual display or monitor that displays information to a user. For example, the display may be a Liquid Crystal Display (LCD), active matrix display, plasma display, or cathode ray tube (CRT). The user interface 52 may include a keypad, a keyboard, a mouse, a light source, a microphone, cameras, and/or speakers. Moreover, the interface and the display may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the user to interact with electronic device 12 to enter data, change settings, control functions, etc. Consequently, when the touch screen is touched, the interface communicates this change to the processor 38 and settings can be changed or information can be captured and stored in the memory 40.

The electronic device 12 need not include all the components described herein. When the electronic device 12 is a stationary electronic device, for example, a server or a PC the gyroscope 42 and/or the accelerometer 44 may not be included. However, when the electronic device 12 is a mobile device, for example, a smart device the gyroscope 42 and/or and accelerometer 44 are included.

Figure 4:
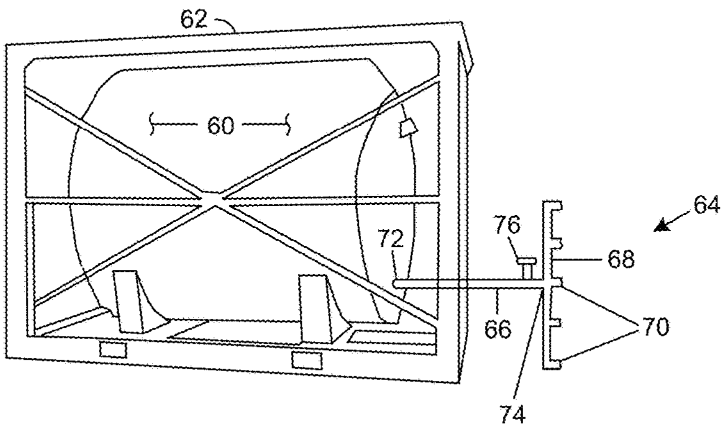
FIG. 4 is a perspective view of an example cryogenic metal tank containing liquid nitrogen.

FIG. 4 is a perspective view of an example cryogenic metal tank 60 containing liquid nitrogen. The tank 60 is positioned in a frame 62. The liquid nitrogen is dispensed through an example spraying mechanism 64 that includes a first pipe 66, a second pipe 68, and a plurality of spray pipes 70. The first pipe 66 includes a first end 72 connected to the tank 60, a second end 74, and a valve 76 located between the first end 72 and the second end 74.

The valve 76 is a shut-off valve for controlling the flow of liquid nitrogen through the spraying mechanism 64. The second pipe 68 is connected to the second end 74 of the first pipe 66 and communicates with the first pipe 66. The second pipe 68 may be transverse to the first pipe 66. However, it is contemplated by the present disclosure that the second pipe 68 may be oriented with respect to the first pipe 66 in any other manner that would facilitate spraying liquid nitrogen on fires to extinguish fires as described herein.

A plurality of spray pipes 70 are connected to the second pipe 68. Typically, the pipes 70 are normal to the second pipe 68 and communicate with the pipe 68. However, it is contemplated by the present disclosure that the pipes 70 may be oriented with respect to the second pipe 68 in any other manner that would facilitate spraying liquid nitrogen on fires to extinguish fires as described herein.

The spray pipes 70 may be uniformly spaced apart along the second pipe 68. Alternatively, the spray pipes 70 may not be uniformly spaced apart and may be at any spacing. The spacing between some of the spray pipes 70 may be different than the spacing between others of the spray pipes 70.

The valve 76 may be operated manually or may be operated via remote control, for example, from the electronic device 12 or the AV 10. When the valve 76 is opened, liquid nitrogen flows through the first pipe 66 and the second pipe 68 and out the spray pipes 70. The valve 76 may be adjusted to control the amount of liquid nitrogen that exits the spray pipes 70, for example, while attempting to extinguish a wild fire or a building fire.

The tank 60 within the frame 62 may be loaded onto a fire truck and carried to a fire or may be carried by an AV 10 to a fire to extinguish the fire.

Figure 5:
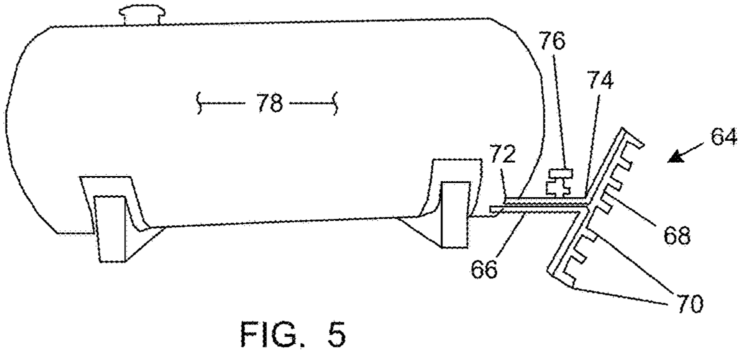
FIG. 5 is a front view of another example cryogenic metal tank containing liquid nitrogen.

FIG. 5 is a front view of another example cryogenic metal tank 78 containing liquid nitrogen and including the liquid nitrogen spray mechanism 64. The tank 78 may be loaded onto a fire truck and carried to a fire or may be carried by an AV 10 to a fire to extinguish the fire.

Figure 6:
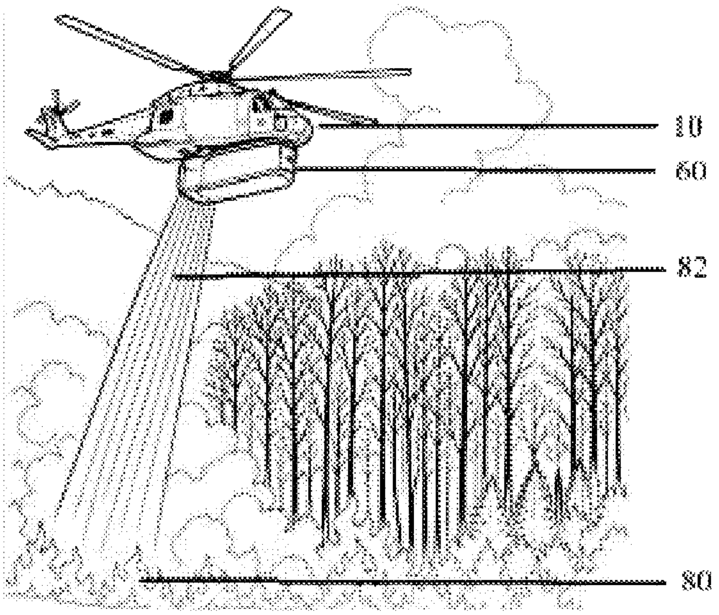
FIG. 6 is a diagram illustrating an example aerial vehicle spraying liquid nitrogen on a fire.

FIG. 6 is a diagram illustrating an AV 10 carrying the liquid nitrogen tank 60 above a wild fire 80 while spraying liquid nitrogen 82 on the fire. The AV 10 is a helicopter. However, it is contemplated by the present disclosure that the AV 10 may alternatively be, for example, a drone or an air plane. The valve 76 is operated to dispense the liquid nitrogen 82 via the spray mechanism 64 onto the wild fire 80. The valve 76 may be remotely controlled, for example, via the electronic device 12 or the AV 10.

Figure 7:
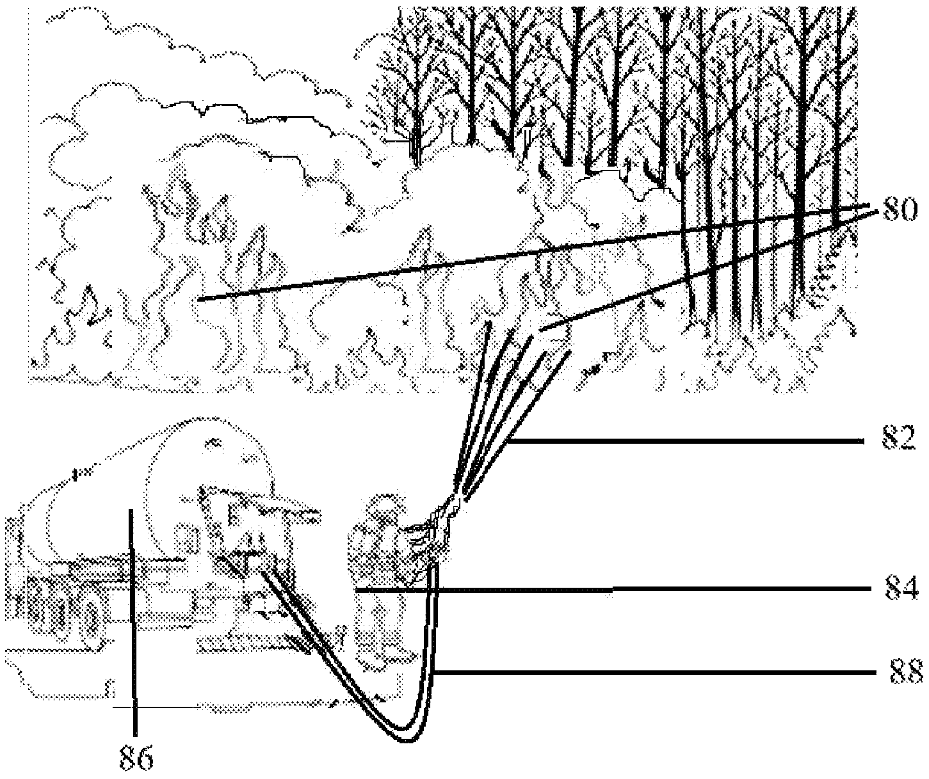
FIG. 7 is a diagram illustrating a firefighter using a hose to spray liquid nitrogen on a wild fire.

FIG. 7 is a diagram illustrating a firefighter 84 spraying liquid nitrogen 82 on a wild fire 80. The liquid nitrogen 82 is dispensed from a fire truck 86 including a liquid nitrogen tank, for example, the tank 60 or the tank 78. A hose 88 is fitted to the tank and is used by the fire fighter to spray the liquid nitrogen 82 on the wild fire 80. It is known that firefighters should be at least four flame heights in distance away from the front of a fire. For example, firefighters should not get closer than four hundred feet if the flames are about one hundred feet high. Firefighters cannot use water sprayed from a fire hose to fight a fire from that distance. However, liquid nitrogen can alternatively be sprayed towards the fire. The liquid nitrogen will transition into nitrogen gas and get sucked into the fire to thus facilitate extinguishing the fire. Liquid nitrogen should be sprayed where the heat would readily change the liquid nitrogen into a gaseous state.

Liquid nitrogen is obtained by separating nitrogen gas from other gases in the air and cooling the separated gas into liquid nitrogen. Liquid nitrogen evaporates or boils directly back into gas at minus 195.79 degrees Celsius or minus 320 degrees Fahrenheit. As liquid nitrogen evaporates into gas and reaches Standard Temperature, it absorbs heat from the surrounding area, for example, at the scene of a fire. Standard Temperature is zero degrees Celsius. Moreover, as the nitrogen gas expands it increases in temperature and facilitates reducing the temperature around a fire and reducing the ratio of oxygen proximate the fire. As a result, the fire is facilitated to be extinguished.

One pound of liquid nitrogen equates to about one hundred gallons of nitrogen gas at standard temperature and pressure. The temperature at the scene of a fire can be hundreds of degrees, for example, five hundred degrees Celsius. At such high temperatures, one hundred gallons of liquid nitrogen equates to about eighteen thousand four hundred gallons of nitrogen gas. As a result of dropping, for example, one hundred gallons of liquid nitrogen on a fire, the liquid nitrogen would transition to a gaseous state and be sucked into the fire to largely if not completely displace oxygen proximate the fire. As a result, the amount of oxygen required to feed the fire is prevented from getting near the fire, which facilitates extinguishing the fire.

When nitrogen gas is sprayed on wildfires, oxygen is not able to get proximate the fire to combine with the fuel. As a result, the wildfire will be extinguished. Fuel may be anything that is flammable, for example, trees and bushes.

Buckets used to carry water for dumping on wildfires by helicopters may be able to carry seventy-two to two thousand six hundred gallons. Planes may carry between ten and twenty thousand gallons of water to fight fires. Contemporary methods of fighting fires include pouring water or fire retardants on fires. However, the water and fire retardants do not expand like nitrogen and extinguish fires only on contact. If a plane sprays ten thousand gallons of water on a fire, some water misses the fire so is wasted. As a result, many times a fraction of the water is actually poured on the fire. By contrast, spraying ten thousand gallons of liquid nitrogen on a fire from a plane would produce between six and seven million gallons of nitrogen gas, all of which would facilitate extinguishing the fire.

The volume of nitrogen gas from the liquid nitrogen is several times greater than the volume of water or fire retardants used to fight fires. Additionally, nitrogen gas can be sucked into fires so it less likely to be wasted and ineffective. As a result, it should be understood that using liquid nitrogen facilitates extinguishing wildfires quicker and more thoroughly than contemporary methods.

It is known that fire retardants generally cost between about three and ten dollars per gallon. Liquid nitrogen generally costs between fifty cents and six dollars and seventy-five cents per gallon. Thus, liquid nitrogen is less expensive than contemporary retardants used for fighting fires. Additionally, it is known that fire retardants dropped on or around fires may contaminate streams, ponds and rivers where the retardants may cause harmful algae blooms and/or may kill aquatic life. The atmosphere of the earth typically includes about seventy-eight percent nitrogen. As a result, using liquid nitrogen that changes to a gaseous state when sprayed on fires to extinguish wild fires will not harm the atmosphere, aquatic life, the environment or wildlife.

Contemporary fire fighting techniques involve spraying, dumping or pouring water and chemical fire retardants onto fires and/or building firebreaks to stop fires from spreading.

Using nitrogen gas reduces the oxygen content of the air surrounding the fire to thus facilitate extinguishing the fire. Air is generally about seventy-eight percent nitrogen, twenty-one percent oxygen, nine tenths of a percent Argon, and four one hundredths of a percent of carbon dioxide. Fires need oxygen to burn. As fires burn, hot carbon dioxide from the fire rises and creates low pressure at the base of the fire. The low pressure causes oxygen to be sucked into the fire to propagate the fire. It is known that fires will not propagate if the atmospheric oxygen concentration is below sixteen percent.

When liquid nitrogen is sprayed or spread out over a fire or proximate the fire, nitrogen gas that evaporates from the liquid nitrogen is sucked into the fire and displaces or mixes with the oxygen from the surrounding air being sucked into the flames. As a result, the fire is deprived of oxygen required to propagate the fire. Thus, the fire is facilitated to be extinguished.

The nitrogen gas, unlike the hot carbon dioxide that comes out of the burning flames, is cold so does not rise up from the fire. Because it does not rise up, the low pressure of the fire sucks the nitrogen gas into the fire. As a result, the nitrogen gas displaces or mixes with the oxygen from the surrounding air being sucked into the fire. Thus, the fire is deprived of oxygen required to propagate the fire and as a result the fire is facilitated to be extinguished.

Oxygen content needs to be more than fifteen percent in the air for diffusion flame production. When the nitrogen gas from the liquid nitrogen expands and is sucked into the fire, the fire stops burning because there is less oxygen around the fire. When the cold nitrogen gas overwhelms the area around the fire, enough oxygen cannot get near the fire and the fire will be extinguished.

Generally, there are two steps in fighting wildfires, early detection and extinguishing the fire.

In clear weather, wildfires can be seen and/or detected by, for example, satellites, AVs 10, and monitoring posts. Detected wildfires should be investigated and confirmed to be wildfires before growing into a size that is difficult to extinguish.

It is known that satellites can provide information in real time regarding active fires and/or hotspots, and the location, extent or size, and intensities of wildfires. Moreover, it is known that satellites can also provide geospatial data and services to inform the public about wildfires and information about how a fire is spreading.

Monitoring equipment, for example, thermal imaging cameras strategically placed on, for example, buildings, poles or elevated places may be used to identify wildfires and send alerts about the wildfires. Such cameras can be equipped with advanced video analytics capabilities, for example, motion detection and intrusion detection. These analytics can be set up to detect unusual heat patterns that might indicate a fire and then send alerts to users.

When a fire is detected by a satellite or monitoring equipment in real time, AVs 10 with thermal imaging cameras may be deployed to investigate and/or fight the fire.

Figure 8:
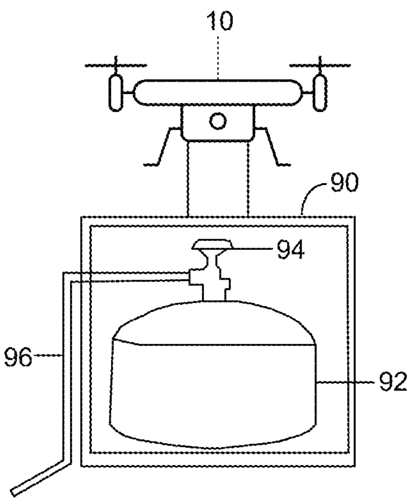
FIG. 8 is a diagram illustrating the aerial vehicle as shown in FIG. 1, carrying a cryogenic metal tank containing nitrogen gas.

FIG. 8 is a diagram illustrating an AV 10 as shown in FIG. 1, carrying a container 90. A tank 92 is located within the container 90. The tank 92 contains nitrogen gas and includes a valve 94 for controlling the flow of nitrogen gas out of the tank 92. The valve 94 is generally remotely operated but may alternatively be manually operated. The valve 94 may be remotely operated by, for example, the electronic device 12 or the AV 10. A metal spray pipe 96 is fitted to the valve 94 to facilitate dispensing or spraying the nitrogen gas on a fire.

Figure 9:
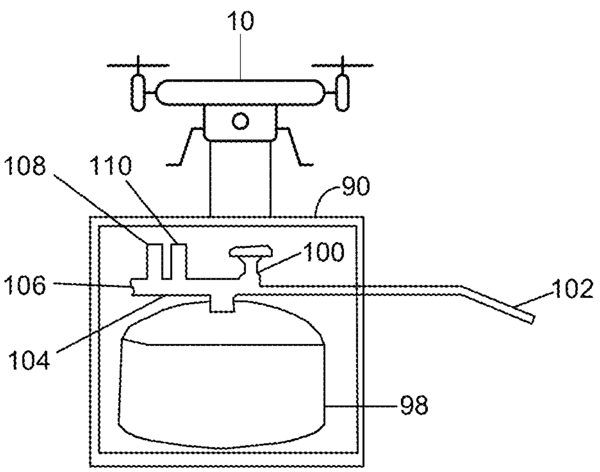
FIG. 9 is a diagram illustrating the aerial vehicle as shown in FIG. 8, carrying a cryogenic metal tank containing liquid nitrogen.

The information shown in FIG. 9 is the same information shown in FIG. 8 as described in more detail below. As such, features illustrated in FIG. 9 that are identical to features illustrated in FIG. 8 are identified using the same reference numerals used in FIG. 8.

FIG. 9 is a diagram illustrating the AV 10 as shown in FIG. 8 carrying the container 90. A cryogenic tank 98 is located within the container 90. However, the tank 98 contains liquid nitrogen instead of nitrogen gas and includes a valve 100 for controlling the flow of liquid nitrogen out of the tank 98. The valve 100 is generally remotely controlled but may alternatively be manually operated. The valve 100 may be, for example, a motorized ball valve or a solenoid valve. A metal spray pipe 102 may be fitted to the valve 100 and is for dispensing the liquid nitrogen from the tank 98 and onto a fire. The tank 98 may contain, for example, between one hundred and one hundred and fifty pounds of liquid nitrogen.

Liquid nitrogen in the tank 98 may evaporate inside the tank 98 and explode. In order to avoid an explosion, a vent is provided. The vent can be, for example, an escape pipe 104 fitted to the valve 100. Alternatively, the vent can be, for example, a hole proximate the valve 100 that facilitates venting evaporated liquid nitrogen.

The pipe 104 has an open end 106 which functions as a vent. Evaporated liquid nitrogen vents out of the tank 98 through the pipe 104 and out the end 106. When liquid nitrogen is to be sprayed on a fire, open end 106 should be closed. Thus, a valve 108 is included in the pipe 104 to close the open end 106 to prevent liquid nitrogen from flowing through the pipe 104 and out the end 106. The valve 108 may be, for example, a motorized ball valve or a solenoid valve and may be remotely controlled or manually operated. The valve 100 and the valve 108 may be remotely operated by, for example, the electronic device 12 or the AV 10 or may operate automatically. A pump 110 is also included proximate the valve 100.

Figure 9A:
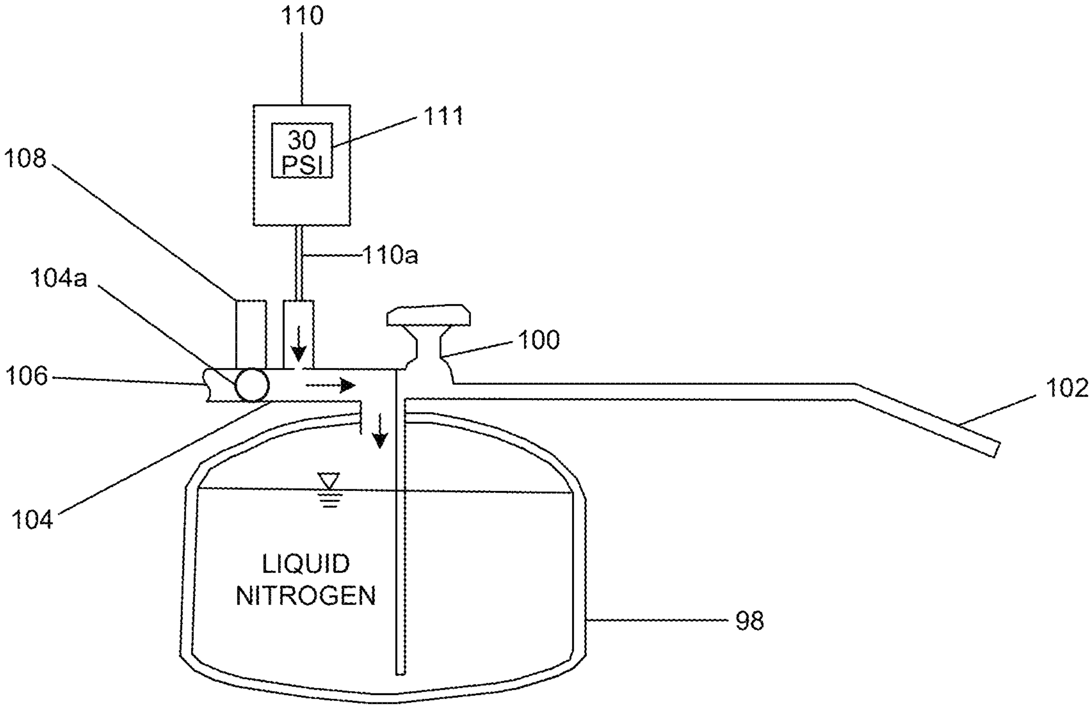
FIG. 9A is an expanded cross-sectional view of the liquid nitrogen tank in a state for spraying liquid nitrogen.

FIG. 9A is an expanded cross-sectional view of the liquid nitrogen tank 98 in a state for spraying liquid nitrogen. More specifically, the valve 108 is closed, the valve 100 is open, and the pump 110 is pumping air into the tank 98. The circle 104*a* indicates that the valve 108 is closed. The valve 108 is closed to prevent pumped air and/or liquid nitrogen from flowing through the escape pipe 104 and out the open end 106.

Pumped air is indicated by the arrows from the pump 110, through escape pipe 104, and into the tank 98. As pumped air enters the tank 98, pressure is created within the tank that forces the liquid nitrogen into the pipe 102 for spraying. A hand-held sized pump 110 may be connected to the pipe 104 and can be remotely operated, for example, by the AV 10 or by the electronic device 12 in order to spray the liquid nitrogen while fighting fires.

The pump 110 may be, for example, a portable electric air compressor, a wired or wireless car air compressor electric tire inflator pump, or a portable hand-held car tire pump with a flexible hose 110*a*. The flexible hose could be used for connecting the pump 110 to the pipe 104 and may be made from, for example, rubber.

The pump 110 may include components the same as or similar to the electronic device 12 and the AV 10 such as, but not limited to, one or more processors, a memory, a gyroscope, an accelerometer, a bus, a display 111, a user interface, and a communications interface as described herein with regard to FIG. 2. General communication between the components in the pump 110 may be provided via the bus. The display 111 may indicate the pressure being applied, for example, thirty (30) pounds per square inch (P.S.I.).

The pump 110 may be manually operated, remotely controlled by, for example, the electronic device 12 or the AV 10, or may operate automatically. The pump 110 may be of any size that facilitates fitting the pump 110 into the container 90. For example, the pump 110 may have a size that allows it to be held in the palm of a person's hand. It should be understood that the flexible hose 110*a* facilitates fitting the pump 110 into the container 90. Prior to spraying liquid nitrogen on a fire, the valve 108 is activated to close the open end 106 and then the pump 110 is activated. The pipe 102 should be a cryogenic pipe and should be extendable.

Figure 10:
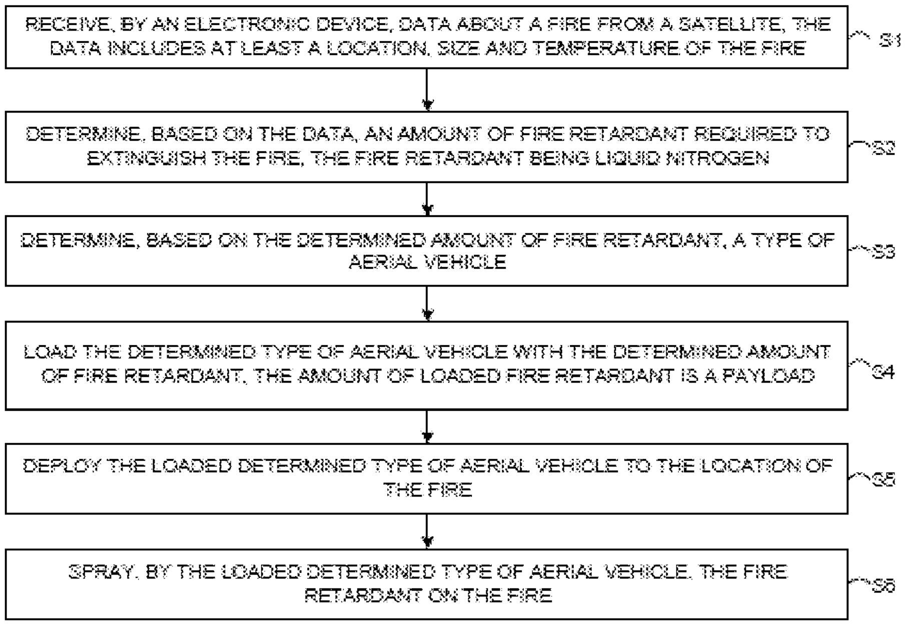
FIG. 10 is a diagram illustrating a method and algorithm for extinguishing fires.

FIG. 10 is a flowchart illustrating an example method and algorithm for extinguishing a fire according to an embodiment of the present disclosure. FIG. 10 illustrates example operations performed when the electronic device 12 runs software 58 stored in the memory 40 and the AV 10 runs software 36 stored in the memory 18.

In step S1, the software 58 executed by the processor 38 causes the electronic device 12 to receive data about a fire. The data may be from, for example, a satellite. The data may be received from the satellite, for example, in real time. It is contemplated by the present disclosure that the data may alternatively be received from, for example, a monitoring post or an aerial vehicle. The received data may include, but is not limited to, the location of the fire, the extent or size of the fire, the intensity of the fire, whether the fire is spreading, and the temperature of the fire.

In response to receiving the data, in step S2, the software 58 executed by the processor 38 causes the electronic device 12 to determine, based on the data, an amount of fire retardant, for example, liquid nitrogen required to extinguish the fire. In step S3, the software 58 executed by the processor 38 causes the electronic device 12 to determine, based on the determined amount of fire retardant, a type of AV 10 to be used for carrying the fire retardant and extinguishing the fire. A number of AVs 10 may also be determined. In this example method and algorithm, the determined type of AV 10 is a single drone.

Next, in step S4, the determined AV 10 is loaded with the determined amount of fire retardant. The amount of loaded fire retardant is a payload. In step S5, the software 36 executed by the processor 16 causes the determined AV 10 to deploy to the location of the fire. The software 58 executed by the processor 38 may cause the electronic device 12 to generate flight path instructions to the location of the fire. The flight path instructions may be stored in the memory 18 of the AV 10 prior to deployment or may be transmitted via the network 14 to the AV 10 while travelling to the fire. The AV 10 follows the flight path instructions when traveling to the fire.

In step S6, the software 36 executed by the processor 16 causes the determined AV 10 to spray the fire retardant on the fire. As the liquid nitrogen falls on the fire, it transforms into a gaseous state and is sucked into the base of the fire.

As a result, the nitrogen gas displaces, blocks, and/or mixes with oxygen at the base of the fire. Thus, the nitrogen gas deprives the fire of adequate oxygen which facilitates extinguishing the fire. After spraying its payload of liquid nitrogen on the fire, the AV 10 returns to a home location.

It is contemplated by the present disclosure that the AV 10 may fly about the fire collecting data including, but not limited to, areas of the fire having the highest temperature, the wind direction about the fire, and the speed of the wind about the fire. The software 36 executed by the processor 16 may cause the AV 10 to determine, based on the collected data, an optimal location of the fire to spray with liquid nitrogen. For example, the optimal location may be the area with the highest temperature. Alternatively, the AV 10 may determine several optimal locations of the fire to spray with liquid nitrogen. After determining the several optimal locations, the AV 10 may spray liquid nitrogen on the fire at each location. Doing so maximizes the fire-fighting effect of the payload and facilitates extinguishing the fire.

Liquid nitrogen should be spread over the wildfire, over an area already burned, or over the windward side of the fire. Liquid nitrogen should be spread on all sides of the fire to deprive the fire of the amount of oxygen to propagate the fire.

For large fires liquid nitrogen should be sprayed on all sides of the fire. However, a single AV 10 may not be able to spray the required amount of liquid nitrogen on all sides of the fire to extinguish the fire. Thus, although a single AV 10 is deployed in the example method and algorithm described herein, it is contemplated by the present disclosure that in other embodiments any number of AVs 10 may be deployed. For example, three AVs 10 may be deployed.

When more than one AV 10 is to be deployed, each AV 10 may have the same or different payload of liquid nitrogen. After arriving at the location of a fire, the AVs 10 may fly about the fire collecting information including, but not limited to, areas of the fire having the highest temperature, the wind direction about the fire, and the speed of the wind about the fire. The AVs 10 may communicate the collected data to a lead AV 10 which can determine, based on the collected data, several optimal locations of the fire to spray. The lead AV 10 is one of the number of deployed AVs 10. Each of the different AVs 10 may be assigned a different optimal location to spray. An AV 10 that does not spray its entire payload at its assigned optimal location may move to and spray other areas of the fire.

When more than one AV 10 is to be deployed, the electronic device 12 may alternatively, or additionally, determine an optimal location for each AV 10 prior to deployment. Each AV 10 may be loaded with an amount of liquid nitrogen adequate to extinguish the fire in the optimal location assigned to the respective AV 10. It is contemplated by the present disclosure that the electronic device 12 may alternatively, or additionally, determine the payload for each AV 10 based on the flight time to the fire. For example, AVs 10 with heavier payloads may take longer to reach the fire while AVs 10 with lighter payloads may take less time to reach the fire. The electronic device 12 may divide the determined amount of liquid nitrogen amongst the AVs 10 to stage their arrival at the scene of the fire. For example, the lighter payload AVs 10 may arrive at the fire first and spray their payloads on the most dangerous areas of the fire to, for example, stop or slow the spread of the fire. The AVs 10 with the heavier payloads may spray their payloads on the remaining optimal areas to extinguish the fire.

Figure 11:
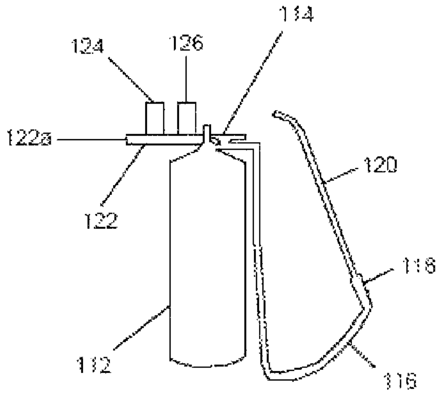
FIG. 11 is a diagram illustrating an example liquid nitrogen cylinder that can be used by a firefighter to extinguish a fire.

FIG. 11 is a diagram illustrating an example liquid nitrogen tank 112 that can be used by a firefighter to extinguish a wild fire or a building fire. The tank 112 can be a metal cylinder and includes a shut-off valve 114 for controlling the flow of liquid nitrogen out of the tank 112. A cryogenic pipe 116 is fitted to the valve 114 and a handle 118 is fitted to an end of the cryogenic pipe 116. An extendable metal pipe 120 is fitted to the handle 118. Liquid nitrogen in the tank 112 may evaporate inside the tank 112 and may explode. In order to avoid an explosion, a vent is provided. The vent can be, for example, an escape pipe 122 fitted proximate the valve 114. Alternatively, the vent can be, for example, a hole proximate the valve 114 that facilitates venting evaporated liquid nitrogen.

The gas escape pipe 122 includes an open end 122*a* that allows evaporated liquid nitrogen to vent out of the tank 112. However, when liquid nitrogen is to be sprayed on a fire the pipe 122 should be closed. Thus, a valve 124 is included in the escape pipe 122 to prevent liquid nitrogen from flowing through the pipe 122. The valve 124 may be, for example, a motorized ball valve or a solenoid valve and may be remotely controlled or manually operated. The shut-off valve 114 and the valve 124 may be remotely controlled by, for example, the electronic device 12 or the AV 10. The open end 106 and the open end 122*a* are examples of gas escape holes that facilitate venting evaporated liquid nitrogen out of the tank 112.

The tank 112 also includes a pump 126 proximate the valve 124. The pump 126 may be the same as the pump 110 described herein with regard to FIG. 9*a*. Prior to spraying liquid nitrogen on a fire, the valve 124 is activated to close the gas escape pipe 122 and then the pump 126 is activated.

Figure 12:
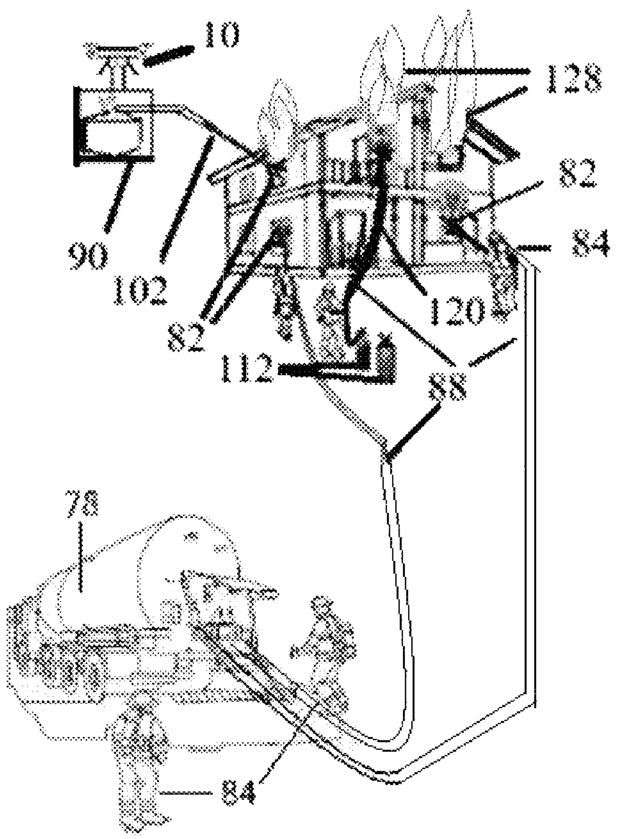
FIG. 12 is a diagram illustrating firefighters extinguishing a fire using nitrogen gas and liquid nitrogen via aerial vehicles and a fire truck containing liquid nitrogen.

FIG. 12 is a diagram illustrating firefighters 84 extinguishing a fire using nitrogen gas and liquid nitrogen 82 via AV 10 and a fire truck carrying, for example, the liquid nitrogen tank 78. If fire trucks carrying liquid nitrogen tanks can get closer to the fire, firefighters can use hoses 88 to spray liquid nitrogen 82 out of trucks carrying liquid nitrogen tanks instead of spraying water. Firefighters 84 may also fight the fire by spraying liquid nitrogen 82 out of the liquid nitrogen cylinders 112 onto the fire and by remotely controlling the AV 10 to spray liquid nitrogen on the fire. If a fire fighter 84 needs to reach higher or further to fight the fire, the firefighter 84 can use, for example, the extendable metal pipe 120 to spray liquid nitrogen 82.

Firefighters 84 can carry the liquid nitrogen tank 112 on their backs or by hand and can spray the liquid nitrogen into any opening of a house or building, room, or a Condo apartment, depending on the severity of the fire. Firefighters 84 carrying the spraying end of the hoses 88 from a fire truck including, for example, the liquid nitrogen tank 78, can spray liquid nitrogen through the windows and doors into the house or room where the fire 128 is burning. Entering the building is not necessary. Alternatively, the building can be entered to get closer to the fire to spray liquid nitrogen.

Fire trucks normally carry about five hundred to one thousand gallons of water. If instead, for example, one thousand gallons of liquid nitrogen is carried and sprayed by a fire truck over a fire, the liquid nitrogen may change into about seven hundred thousand gallons of nitrogen gas. Not all the water sprayed into a burning house facilitates extinguishing the fire. In contrast, almost all nitrogen gas is sucked into a fire to thus facilitate extinguishing the fire.

After the fire is extinguished, nitrogen gas need not be blown away by fans because it is lighter than oxygen and the carbon dioxide.

Figure 13:
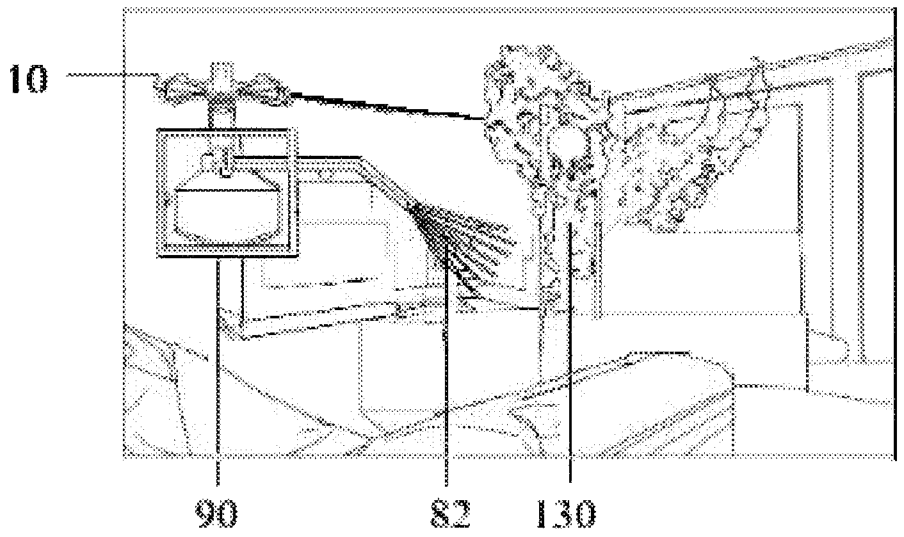
FIG. 13 is a diagram illustrating an example aerial vehicle extinguishing a fire inside a building.

FIG. 13 is a diagram illustrating an example AV 10 spraying liquid nitrogen 82 on a fire 130 to extinguish the fire 130 inside a building. The AV 10 as shown is a drone.

The AV 10 can carry, for example, the liquid nitrogen tank 98 near or into a house to spray liquid nitrogen 82 into or near a fire to facilitate extinguishing the fire 130. It should be understood that liquid nitrogen 82 need not be sprayed directly on the fire because the liquid nitrogen will change into nitrogen gas if sprayed close to the fire.

For larger building fires, fire fighters may use two cylindrical tanks 112 at the same time to spray nitrogen gas or liquid nitrogen 82 into a building. Almost all of the liquid nitrogen 82 will immediately become gaseous and get sucked into the fire 130 to facilitate extinguishing the fire 130.

Using liquid nitrogen to fight wildfires, large fires and house fires is less expensive and more effective than other known methods of fighting fires and will not harm the environment and wildlife. Liquid nitrogen is produced from the air, so it does not harm the environment. The example methods and systems described herein facilitate protecting forests, people, the environment and the climate.

It is contemplated by the present disclosure that the example methods and algorithms described herein may be conducted partly by the electronic device 12 and partly by the AV 10; entirely by the AV 10; partly by the AV 10 and other AVs (not shown), or by any other combination of other servers (not shown), electronic devices (not shown), or computers (not shown) operable to communicate with the electronic device 12 and the AV 10 via the network 14. Furthermore, data described herein as being stored in the electronic device 12 may alternatively, or additionally, be stored in the AV 10 or any other AV 10 (not shown), any other server (not shown), electronic device (not shown), or computer (not shown) operable to communicate with the electronic device 12 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method of extinguishing a fire comprising the steps of:

receiving at a home location, by an electronic device, data about a fire from a satellite, the data including at least a location, size, and temperature of the fire;

determining, based on the data, an amount of fire extinguishant required to extinguish the fire, the fire extinguishant being liquid nitrogen;

determining, based on the determined amount of fire extinguishant, a type of aerial vehicle, wherein the type of aerial vehicle includes a plurality of the type of aerial vehicle;

determining portions of the fire extinguishant to load onto each of the plurality of the type of aerial vehicle based on a flight time to the location of the fire, wherein the portions can be the same or different;

loading each of the plurality of the type of aerial vehicle with the respective portion of the fire extinguishant, the amount of loaded fire extinguishant being a payload;

deploying, from the home location, each of the plurality of the loaded type of aerial vehicle to the location of the fire;

spraying, by each of the plurality of the loaded determined type of aerial vehicle, the fire extinguishant on the fire; and after completing said spraying step, flying, by each of the plurality of the determined type of aerial vehicle, from the location of the fire to the home location.

2. The method according to claim 1, wherein the determined type of aerial vehicle is an autonomously controlled drone, said spraying step further comprising:

collecting, by each autonomously controlled drone, data about the fire, the collected data including at least the areas of the fire with the highest temperatures, the wind direction about the fire, and the wind speed about the fire;

determining, based on the collected data, optimal locations of the fire to spray with the fire extinguishant, wherein each of the plurality of drones is assigned a different one of the optimal locations; and spraying, by each of the autonomously controlled drones, the fire extinguishant on the fire at the optimal location assigned to the respective drone.

3. The method according to claim 2, wherein:

the data collected by each autonomously controlled drone is communicated with the other autonomously controlled drones or the electronic device; and one of the plurality of autonomously controlled drones or the electronic device determines, based on the collected data, optimal locations of the fire to spray with the fire extinguishant.

4. The method according to claim 1, wherein:

each of the plurality of the type of aerial vehicle includes at least one cryogenic tank for storing the respective portionof fire extinguishant; and the at least one cryogenic tank includes a shut-off valve, the shut-off valve being controlled by the respective one of the type of aerial vehicle.

5. The method according to claim 2, said spraying step further comprising spraying, by one of the autonomously controlled drones, a different area of the fire when the entire payload of the one autonomously controlled drones is not sprayed at the optimal location assigned to the one autonomously controlled drone.

6. The method according to claim 2, wherein at least two of the plurality of autonomously controlled drones are assigned to the same optimal location, said spraying step comprising:

spraying, by the at least two autonomously controlled drones at different times, the fire extinguishant on the fire at the optimal location assigned to the at least two autonomously controlled drones.

7. The method according to claim 2, further comprising changing the optimal location assigned to one of the plurality of autonomously controlled drones while the drone is at the fire.

8. The method according to claim 1, said spraying step comprising spraying the fire extinguishant via a spraying mechanism, the spraying mechanism comprising:

a first pipe connected to a cryogenic tank;

a second pipe oriented transversely to the first pipe; and a plurality of spray pipes connected to the second pipe, the spray pipes being normal to the second pipe, wherein the first pipe, second pipe, and spray pipes communicate with each other such that the fire extinguishant flows from the cryogenic tank through the first and second pipes and out the spray pipes.

9. The method according to claim 8, wherein the spray pipes are uniformly spaced apart along a length of the second pipe.

10. The method according to claim 8, wherein the first pipe includes a valve for controlling the flow of fire extinguishant that exits the spray pipes.

* * * * *